United States Patent
Mohan et al.

(10) Patent No.: US 6,748,382 B1
(45) Date of Patent: Jun. 8, 2004

(54) METHOD FOR DESCRIBING MEDIA ASSETS FOR THEIR MANAGEMENT

(75) Inventors: Rakesh Mohan, Stamford, CT (US); Chung-Sheng Li, Ossining, NY (US); Howard L. Operowsky, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/451,886

(22) Filed: Dec. 1, 1999

Related U.S. Application Data

(60) Provisional application No. 60/117,645, filed on Jan. 28, 1999.

(51) Int. Cl.[7] .............................................. G06F 17/30
(52) U.S. Cl. ...................... 707/10; 707/103; 707/104.1; 709/216; 709/224
(58) Field of Search .............................. 707/10, 5, 103, 707/3, 104.1, 500.1; 709/221, 224, 216; 717/11

(56) References Cited

U.S. PATENT DOCUMENTS

| | | | | |
|---|---|---|---|---|
| 5,481,752 A | * | 1/1996 | Suzuki et al. ............... | 395/800 |
| 5,671,225 A | * | 9/1997 | Hooper et al. .............. | 370/468 |
| 5,680,619 A | * | 10/1997 | Gudmundson et al. ..... | 395/701 |
| 5,748,956 A | * | 5/1998 | Lafer et al. ................. | 395/615 |
| 5,778,049 A | * | 7/1998 | Young et al. ................ | 379/10 |
| 5,819,250 A | * | 10/1998 | Trader et al. ................ | 707/1 |
| 5,893,110 A | * | 4/1999 | Weber et al. ............... | 707/104 |
| 5,970,490 A | * | 10/1999 | Morgenstern ............... | 707/10 |
| 6,006,332 A | * | 12/1999 | Rabne et al. ............... | 713/201 |
| 6,199,060 B1 | * | 3/2001 | Gustman ...................... | 707/3 |
| 2002/0054172 A1 | * | 5/2002 | Berman et al. ............. | 345/856 |

OTHER PUBLICATIONS

Philippe Salembier: MPEG–7 Multimedia Description Scheme, Jun. 2001, IEEE vol. 11, Issue:6, pp. 748–759.*

* cited by examiner

Primary Examiner—Charles Rones
Assistant Examiner—Jacques Veillard
(74) Attorney, Agent, or Firm—Thu Ann Dang; Gail H. Zarick; Anne V. Dougherty

(57) ABSTRACT

A system and method for describing and managing media assets comprising a two-pronged solution: (1) a Digital Library to provide a centralized repository of the media assets and (2) a standard description scheme that will allow interoperation of a variety of tools and processes required for managing media assets. In the invention, a description scheme is provided that addresses information needed for managing media assets independent of their type. In addition, the invention provides a description scheme for logical collections of media assets. The media asset management description scheme may be based on eXtensible Markup Language (XML), to ensure maximum interoperability.

13 Claims, 4 Drawing Sheets

METHOD FOR DESCRIBING MEDIA ASSETS FOR THEIR MANAGEMENT

This application claims the benefit of Provisional Application No. 60/117,645, filed Jan. 28, 1999.

FIELD OF INVENTION

The present invention relates to a method and process for uniformly describing media assets, such as video, images, graphics, text, and audio, such that a multiplicity of tools used for production, approval, inventory, sales, rights management and other media management processes, can easily interoperate against a uniform view of a consistent set of media repositories.

BACKGROUND OF THE INVENTION

A large number of businesses have media as a critical component. Media companies such as television studios, networks, multimedia and Internet publishing have media assets as their primary product. Advertising companies use media as their service delivery vehicle. Companies that are not in the media business also need to manage media assets from training videos to promotional literature.

A plethora of tools, processes and people are involved in the production, management, search, sales, and distribution of the media assets of a company. Media assets get fragmented across different systems because different tools and different departments handle different processes. Furthermore, there is a strong interoperability problem as these tools and departments often use different description schemes for the media assets. Thus, managing media assets is an important and difficult problem.

A standard description scheme for managing media assets will benefit a large number of industries that manage media as a direct or indirect part of their business. It will benefit the tools and processes used for managing media assets by allowing them to interact based on a shared standard description scheme.

A number of different tools and processes are used during the lifecycle of a media asset. For example, for a video asset, one tool is used for editing the video, another for logging it into the Digital Library, another for searching videos in the library, another for tracking the approval workflow, and possibly another for version control. A common description scheme for the media asset and its management information would ensure that these tools could use data generated by other tools, and in turn generate data that other tools could use. This would allow interoperability across different task specific tools on the same media assets which are stored in a common media repository.

In an advertising agency scenario, for a particular promotional effort, a number of media assets may need to be created and managed. The media assets could be videos for television, audio for radio commercials, and photographs, graphics and text for print advertisements. Different departments, such as print and video, may need to look at other material so as to maintain a common theme. An account manager may need to keep track of the progress on the media assets across the different departments. This manager may have access to view media asset collections for other advertisement campaigns, but the customer may be allowed to view only the assets related to his campaign. A description scheme for managing a logical collection of media assets and access to same would be very useful in these tasks.

It is, therefore, an object of the present invention to provide a standard description scheme for media assets.

It is another object of the invention to access a Digital Library comprising a centralized repository of media assets using a standard description scheme.

Yet another object of the invention is to provide a self-describing media asset description scheme such that a variety of different tools and users can access relevant information about a media asset from the single description.

Still another object of the invention is to provide a standard media asset description scheme which can be integrated into existing media handling tools and processes in order to standardize not only the storage access but also the local descriptions of media assets.

SUMMARY OF THE INVENTION

The foregoing and other objects are realized by the present invention which comprises a two-pronged solution: (1) a Digital Library to provide a centralized repository of the media assets and (2) a standard description scheme that will allow interoperation of a variety of tools and processes required for managing media assets. In the invention, a description scheme is provided that addresses information needed for managing media assets independent of their type. In addition, the invention provides a description scheme for logical collections of media assets. The media asset management description scheme may be based on eXtensible Markup Language (XML), to ensure maximum interoperability.

BRIEF DESCRIPTION OF THE DRAWINGS

The invention will now be descried in greater detail with specific reference to the appended drawings wherein:

FIG. 6 provides a representative process flow in accordance with the present invention.

DETAILED DESCRIPTION OF THE INVENTION

This invention proposes self-describing schemes for media assets. A media asset description is composed of (1) a description of a hierarchy of multi-modal, multi-resolution versions of the media content and (2) a description of the information critical to managing and administering media assets. Furthermore, the description provides for describing collections of such media assets and the information required for managing them as logical entities. To handle specific media types, existing description schemes for those types, for example for the description of individual image/video documents, can be imported. The descriptions are preferably defined using the eXtensible Markup Language (XML) to ensure maximum interoperability and flexibility.

The invention comprises a Description Scheme (hereinafter "DS") for organizing, tracking, searching, managing and administering media assets stored in Digital Libraries. The DS will be useful for media based businesses in their media processes including production, inventory, workflow, sales, rights management and access control. This DS describes both individual media items, and logical collections of media assets. The proposed description schemes for content descriptions of multimedia archives are self-describing in the sense that they combine the data and the structure of the data in the same format using XML (eXtensible Markup Language). The advantages of such descriptions include flexibility, easy validation, and efficient exchange.

Figure 1:
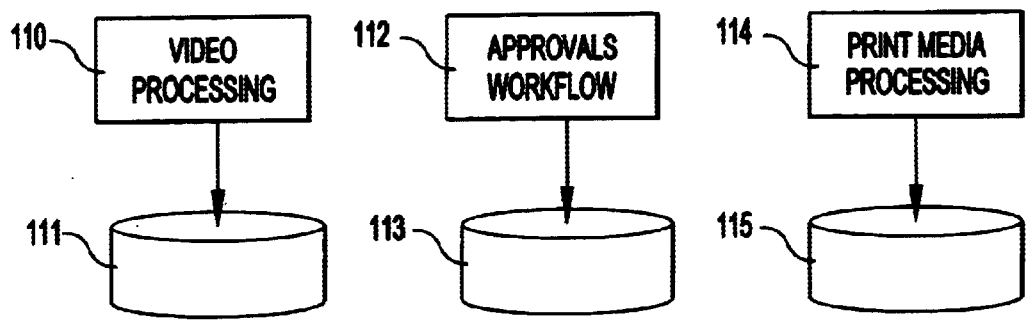
FIG. 1 provides a representative illustration of a prior art media asset system.

As depicted in FIG. 1, a prior art media asset management system was comprised of a plurality of independent media asset processing tools, 110, 112 and 114, each of which independently accessed the media assets from repositories 111, 113 and 115 respectively, for processing thereof The video processing tool at 110 would retrieve and store the video from repository 111, with no interaction, for example, with the output of the print media processing tool 114 which was stored at 115. Similarly, any approval processing by, for example, a legal department with tools at 112 would not be coordinated with, nor be cross-referenced to, the stored video (at 111) or print (at 115) versions of the related media assets. The shortcomings of the foregoing system have been discussed in the Background section above.

Figure 2:
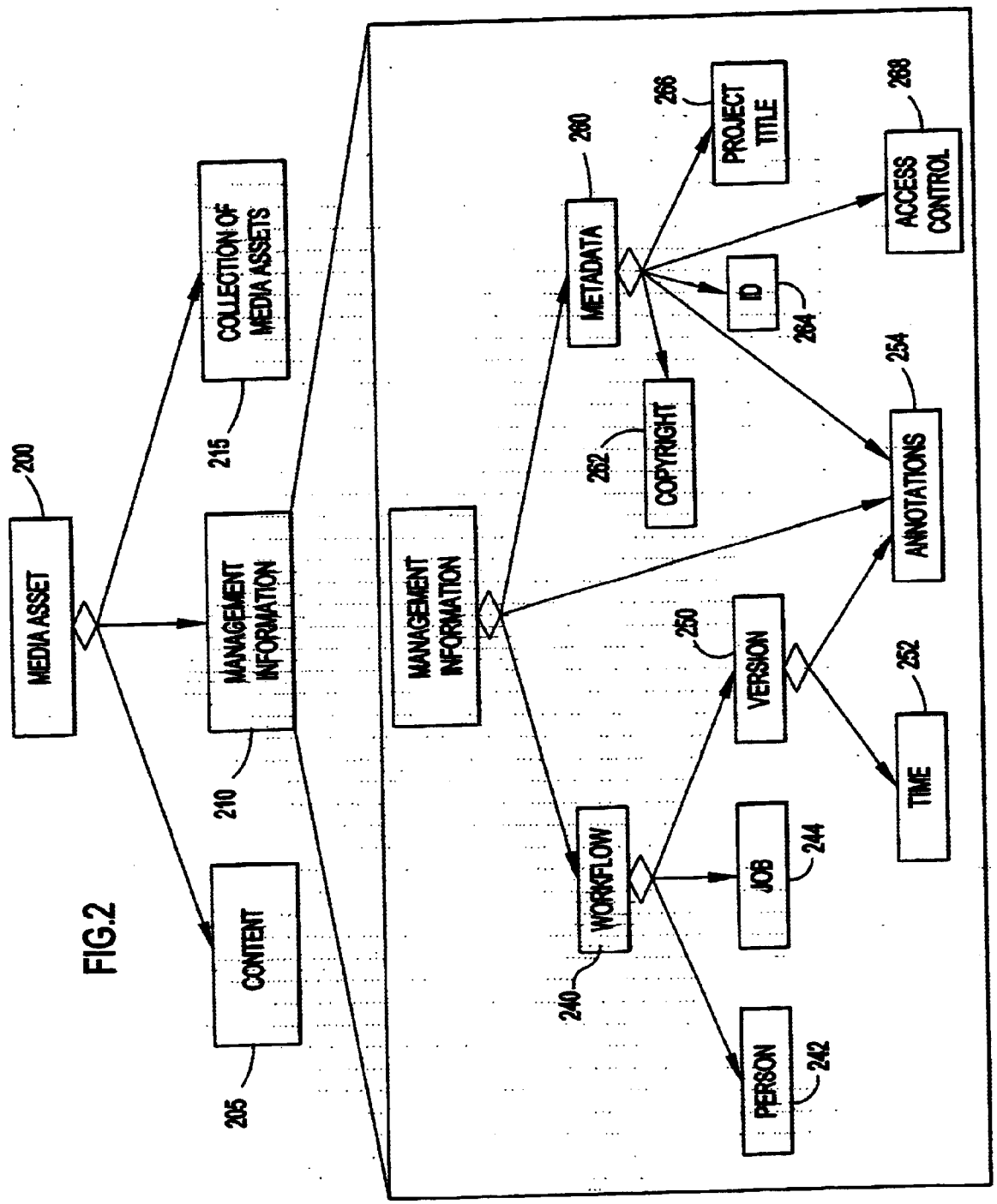
FIG. 2 provides a representative description scheme for a media asset in accordance with the present invention, including a detailed representation of the management information which can be stored as part of the inventive description scheme.

What is preferable, and what is the subject of the present invention is a description scheme which allows all relevant tools to locate the asset, identify the asset, and store relevant information about the asset for use by other tools. As shown in FIG. 2, the media asset 200 description element includes not only a content, element 205 which describes the media item or collection of media assets (215), but also a management element 210 containing data required for managing the media asset. The management information 210 is shown in greater detail with specific references to a video asset. It is to be understood that the inventive Description Scheme can be applied to media assets other than a video asset; but, that the video asset is featured for ease and completeness of the description of invention.

Figure 3:
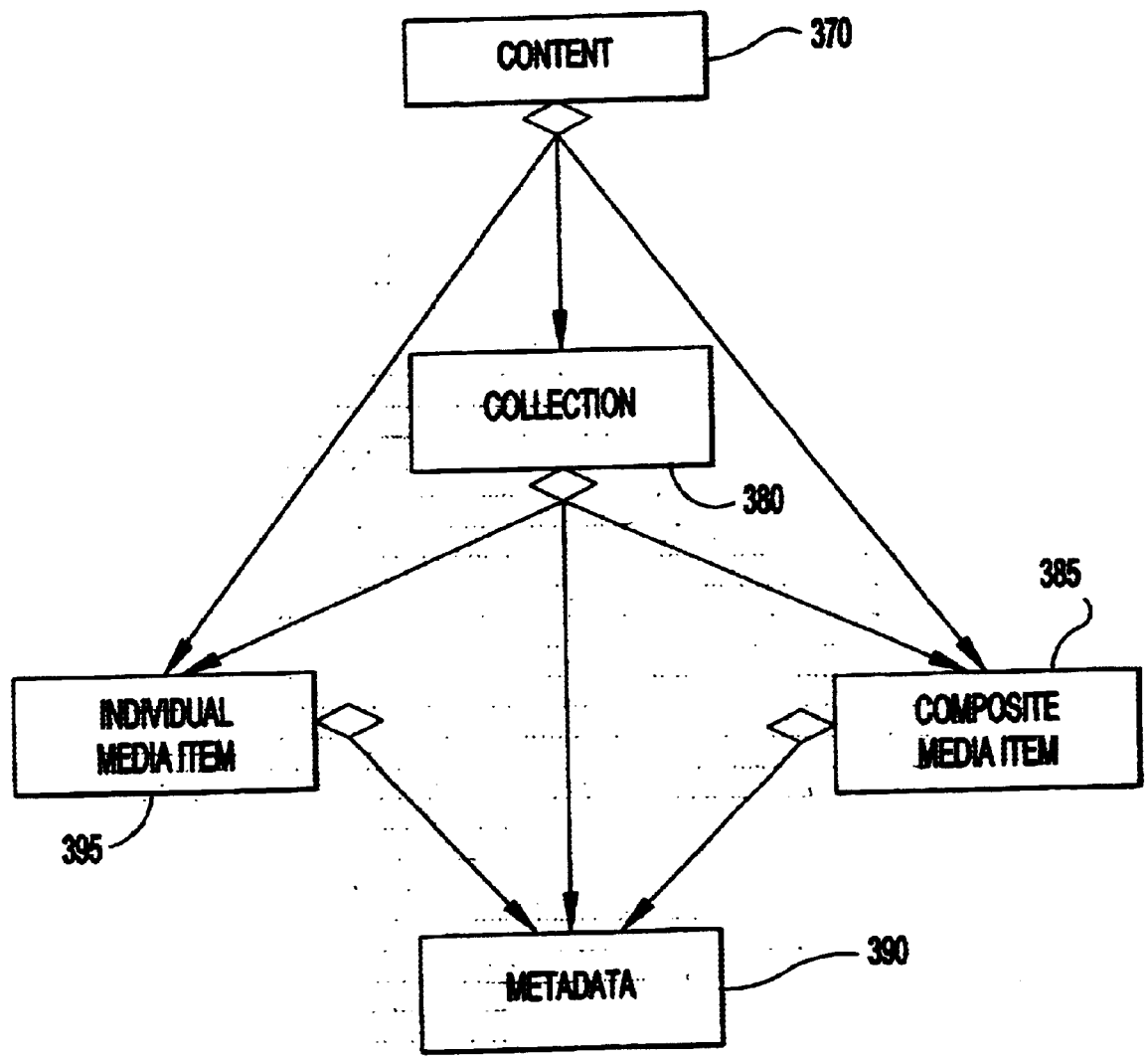
FIG. 3 illustrates a more detailed description hierarchy for content as part of the inventive description scheme FIG. 4 provides a representative illustration of a media asset management system in accordance with the present invention.

Relevant management information consists of identification related metadata 260, workflow related information 240 and possible textual information/annotations 254. The identification metadata may consist of ID 264, titles 266, access control information 268 and rights, such as copyright information at 264. The workflow information keeps track of the parties that have worked on or with the asset (person 242), what has been done (job 244) and when (version 250 comprising time 252 and annotations 254). Some examples of management related metadata which may be incorporated are included below:

Asset Identifier
Asset Type—correspond to MIME type/subtype pairs
Descriptive name
Language of text entries
Textual Description
Version
Creation Date
Creator
Owner
Access List
   List of all allowable operations on the asset
   Users allowed access to asset
   List of allowed operations per user
Modification History
   Who
   When
   Why?
Thumbnail/Icon associated with asset (for graphical representation)
Intellectual Rights Information
   Bought or sold
   Markets covered
   Languages covered
   Time periods covered
   Currencies covered
   Exclusive/Non-exclusive license
      Exceptions
   Containing product type or package
   Financial arrangements
      Royalty calculation
      Audit trail of contract revisions
      Participants, such as agents, owners, and creators
      Royalty considerations per participant
         Gross/net, with/without profit participation, varying rates for different uses
   License Status, e.g., owned and sold, owned and unsold, etc.
Workflow Information
Index State
Index Attributes, i.e., data attributes indexed
Synchronization
   Lock
   Lock holder
   Waiting List
Content Distribution Information ?
   Distribution media, e.g., satellite, wireless microwave, etc.
   Target locations and location groups As shown in FIG. 3, the Content 370 can be an individual media item 375, such as an image or video, or a composite media item 385, such as a multimedia document, MPEG-4, or InfoPyramid, or a collection of such items 380. Each media item has associated metadata 390 that describes formats, storage information, size, etc. Where existing description schemes and descriptors have been established for specific media items (e.g., as adopted by MPEG-7), those existing descriptions can be imported into the inventive description scheme.

Figure 4:
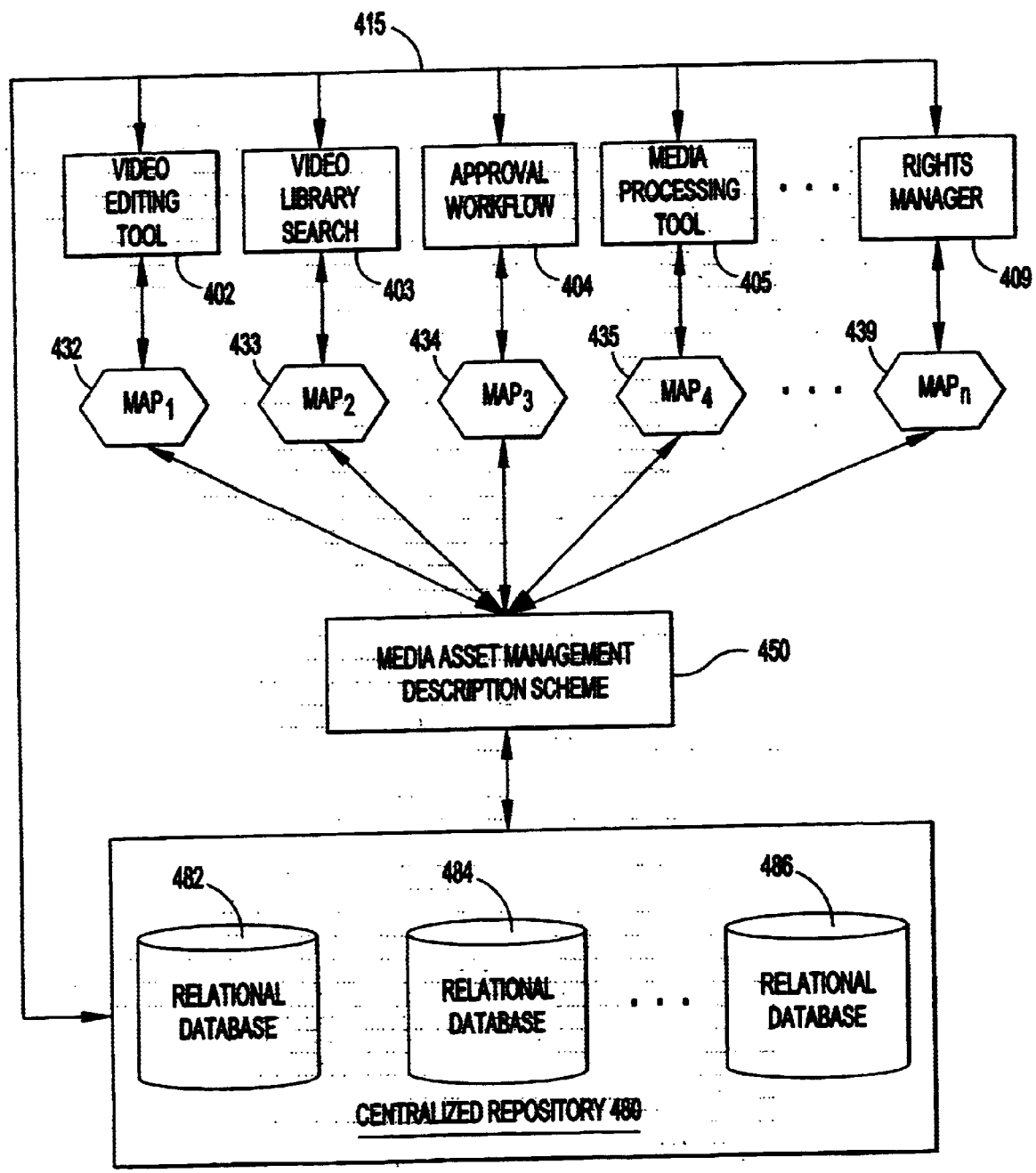

FIG. 4 provides a representative illustration of a media asset management system in accordance with one embodiment of the present invention. As depicted therein, a media asset management system 400 uses the media asset management description scheme 450. There are a number of different software systems or tools used in the media asset production, development, management and distribution lifecycle. For example, the media processing tools could include a video editing tool 402, a video library 403 for providing searching relative to the asset, an approval process workflow system 404, and a rights manager 409 for managing the rights associated with the media component. Each of the media processing tools potentially uses a different description scheme for the media asset. One reason is that the media asset processing products are often made by different vendors. Another reason is that different tools need to address sets of media asset attributes that do not overlap (e.g., the video editing tool would store the parameters used for a special effect, while the rights management tools has no requirement for a special effects media attribute). However, the name of the editor and the dates on which edits were made, along with the ID of the video asset on which edits were made, would be useful information across the video editing tool, the video library, the approval workflow tool and the rights manager. The media properties that are described by the inventive DS 450 are preferably those which are common to more than one tool.

Under the inventive system, all media assets are stored in a central repository 480 which may include a plurality of relational databases 482, 484 and 486. The media properties that ate described by a tool, and are covered by the DS are converted, or mapped by 432, 433, 434, 435 and 439, between the native descriptions used by the tool and the DS. For those media properties which are specific to a particular media tool and of no utility to other tools, however, the properties can be sent directly to the media repository, without mapping through the DS. For example, for the video editing tool 402, the parameters for a special effect would be stored directly in the video media repository, along line 415, while the identity of the video item, the editor, the time of the edits, etc, would be mapped by the mapping software 432 to the DS 450. There are a number of known ways to map between two different data representation schemes, such as that detailed in co-pending patent application Ser. No. 09/235,793, (YO998-407) filed Jan. 22, 1999 and entitled "Data Representation Schema Translation Through Shared Examples". As the mapping is not a part of the present invention, no further detail need be provided at this time.

Figure 5:
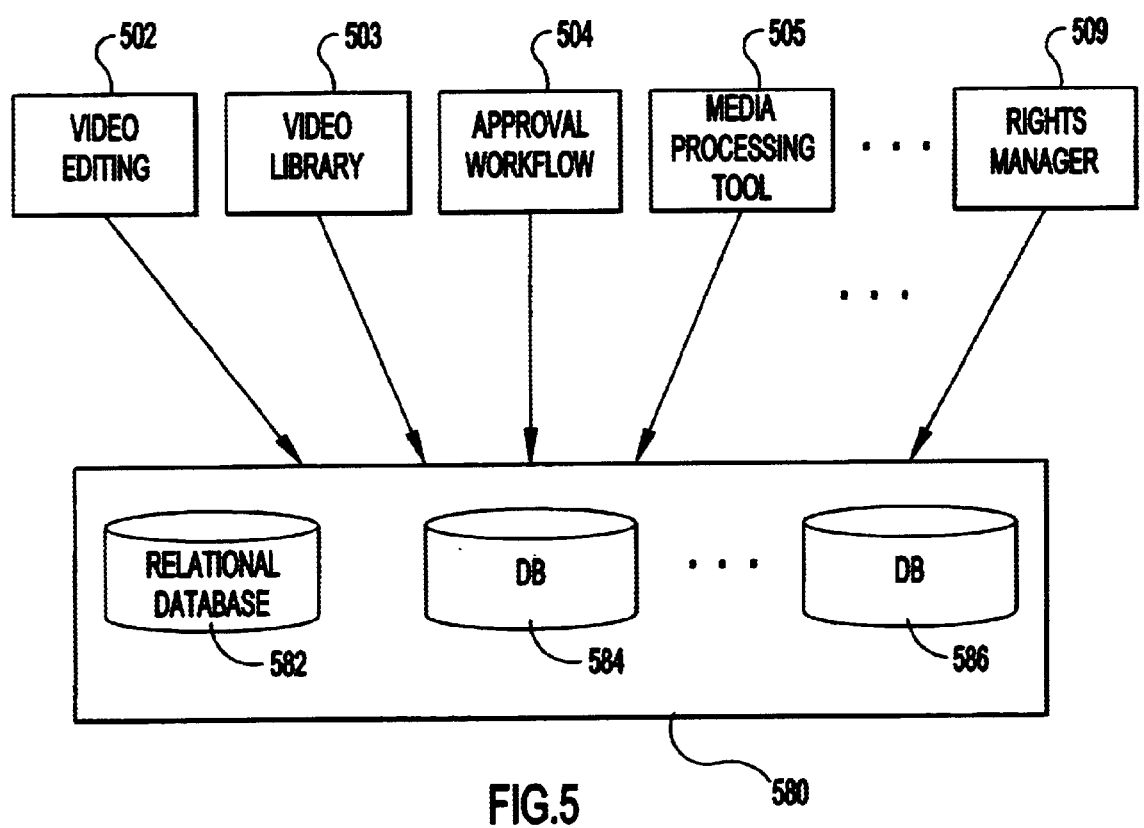
FIG. 5 provides an illustration of an alternative embodiment of a media asset management system in accordance with the present invention.

FIG. 5 provides an illustration of an alternative embodiment of a media asset management system in accordance with the present invention. Since the inventive description scheme will provide innumerable benefits for the management of a media asset, it is envisioned that the media asset tools, 502–509, in the future will be modified to directly provide output to the repository 580 which identifies and describes the media asset in accordance with the description scheme. As such, the mapping component and step would no longer be necessary.

Below, a possible rendition of a video media asset using XML is detailed.

```
<media-asset id="X12AZ3"> <!—media asset #X12AZ3—>
    <!—Media content—>
    <content> <!—InfoPyramid—>
        <IP:video-ip> <!—video InfoPyramid—>
            <video fidelity="1.0">
                <source location="URL">foo.com/xyz.mp2</source>
                <encoding>MPEG-2</encoding>
                <duration>00:12:34::12</duration>
            </video>
            <video fidelity="0.5">
                <source location="URL">foo.com/xyz.mp1</source>
                <encoding>MPEG-1</encoding>
                <duration>00:12:34:12</duration>
            </video>
        </IP:video>
        <IP:image-ip>
            <COL:image type="sequence"> <!—the key-frames described in the collection DS. [4]—>
        </IP:image-ip>
        . . .
    </content>
```

```
<!—Meta-data for media asset management—>
<management>
    <acl>
        <person role="owner">
            <name>Joe B. Editor</name>
            <rights>read write</rights>
        </person>
        <person role="reviewer">
            <rights>annotate</rights>
        </person>
        . . .
    </acl>
    <version-control>
        <version number="1.0">
            <name>Jane Doe</name>
            <task>edit</task>
            <tool>Avid</tool>
            <time>01/01/99 12:30 pm</time>
            <note>The initial cut</note>
        </version>
        . . .
    </version-control>
    . . .
</media-asset>
```

The description scheme can also deal with collections of media assets. These collections are of a variety of types, for example (1) a sequence of video assets which (together with an edit decision list) are used create a new video asset; (2) different versions of a media assets where the content represented as a sequence, or, (3) a bag or unordered collection of media assets for an advertisement campaign. In describing collections, the media asset content element is composed of a collection item. The DDL may define standard ways of defining such collections.

```
<media-asset>
    <content>
        <sequence>
            <version idref="X12AZ3"number"1.0">
                <note>The original cut</note>
            </version>
            . . .
        <sequence>
            . . .
    </content>
    . . .
</media-asset>
```

In summary, the content description element is composed of a media element, or an InfoPyramid element or a collection element.

Media asset management is an important activity for a number of businesses. The Media Asset Management DS allows multiple tools and systems to inter-operate on shared media repositories. It leverages various DS and D for description of the content of the media asset and adds information needed for its management. The invention has been described with specific reference to preferred embodiments. One having skill in the art will realize that modifications can be made without departing from the spririt and scope as set forth in the appended claims.

We claim:

1. A system for managing media assets comprising:
   a central repository comprising a plurality of databases for storing media assets at said central repository; and
   a centralized view of the contents of said central repository, said centralized view describing the media assets stored in said repository using a standard description scheme comprising a content element comprising information for accessing said media asset and a management element containing handling information required for the management of said media asset by a plurality of tools and processes independent of type.

2. The system of claim 1 further comprising a plurality of tools for processing media assets.

3. The system of claim 2 further comprising a plurality of components for mapping said media assets from each of said plurality of tools to said centralized view.

4. The system of claim 1 further comprising a search component associated with said central repository for accessing said media assets using said centralized view.

5. The system of claim 1 wherein said centralized view comprises a description hierarchy of versions of said media assets.

6. The system of claim 5 wherein said centralized view further comprises a description of metainformation for administration of said media assets.

7. The system of claim 1 wherein said centralized view is provided using eXtensible Markup Language (XML).

8. A method for managing a plurality of media assets comprising:

storing a plurality of media assets in a central repository comprising a plurality of databases at said central repository; and describing the media assets stored in said repository by establishing a centralized view of the contents of said central repository using a standard description scheme comprising a content element comprising information for accessing said media asset and a management element containing handling information required for the management of said media asset by a plurality of tools and processes independent of type.

9. The method of claim 8 wherein said system further comprises a plurality of tools for processing media assets, said method further comprising the steps of:

retrieving at least one of said media assets from said central repository;

processing said at least one of said media assets;

generating processing information about said processing; and storing said media assets and processing information to said central repository using said centralized view.

10. The method of claim 9 further comprising a plurality of components for mapping said media assets from each of said plurality of tools to said centralized view, said method further comprising mapping said media assets and said processing information to said centralized view.

11. The method of claim 8 wherein said describing using said centralized view comprises creating a description hierarchy of versions of said media assets.

12. The method of claim 11 wherein said describing further comprises providing a description of metainformation for administration of said media assets in said centralized view.

13. The method of claim 8 wherein said describing comprises providing said centralized view using eXtensible Markup Language (XML).

* * * * *